United States Patent [19]

Koga et al.

[11] 4,151,442

[45] Apr. 24, 1979

[54] COLOR TELEVISION CATHODE RAY TUBE

[75] Inventors: Yoshio Koga; Tsuneyo Sumita; Nobuo Inoue; Susumu Matsuura, all of Yokohama, Japan

[73] Assignee: Tokyo Shibaura Electric Co., Ltd., Kawasaki, Japan

[21] Appl. No.: 810,784

[22] Filed: Jun. 28, 1977

[30] Foreign Application Priority Data

Jun. 29, 1976 [JP] Japan ................................ 51-76011

[51] Int. Cl.$^2$ ...................... C09K 11/18; C09K 11/46; H01J 29/20

[52] U.S. Cl. .................................. 313/467; 313/468; 252/301.4 R; 252/301.4 S; 252/301.6 S

[58] Field of Search .................. 252/301.4 R, 301.4 S, 252/301.6 S; 313/467, 468

[56] References Cited

U.S. PATENT DOCUMENTS

| | | | |
|---|---|---|---|
| 2,402,757 | 6/1946 | Leverenz | 252/301.6 S |
| 2,623,858 | 12/1952 | Kroger | 252/301.6 S |
| 3,423,621 | 1/1969 | Royce | 313/468 |
| 3,922,233 | 11/1975 | Torii et al. | 252/301.6 S |

FOREIGN PATENT DOCUMENTS

| | | | |
|---|---|---|---|
| 1315572 | 12/1962 | France | 252/301.6 S |

*Primary Examiner*—Jack Cooper
*Attorney, Agent, or Firm*—Cushman, Darby & Cushman

[57] ABSTRACT

A color television cathode ray tube which comprises a phosphor screen formed of (A) a red-emitting phosphor selected from the group consisting of europium-activated rare earth metal oxide and europium-activated rare earth metal oxysulfide; (B) a green-emitting phosphor selected from the group cosisting of a mixture of copper-activated zinc sulfide and gold-activated aluminum-coactivated zinc sulfide and copper- and gold-activated zinc sulfide; and (C) a blue-emitting phosphor of silver-activated zinc sulfide, and wherein the green-emitting phosphor contains 0.005 to 0.02% by weight of copper and 0.005 to 0.15% by weight of gold based on the total amount of the green-emitting phosphor; and current running through the cathodes of electron guns for exciting the red-, green- and blue-phosphors can be made to have a substantially equal amount for the respective electron guns.

3 Claims, 4 Drawing Figures

COLOR TELEVISION CATHODE RAY TUBE

BACKGROUND OF THE INVENTION

This invention relates to improvements on a color television cathode ray tube and more particularly to improvements on phosphors applied to the surface of the glass face plate of the cathode ray tube.

Generally, a color television cathode ray tube comprises a glass face plate whose surface is coated with a phosphor screen or film formed of dotted or striped red-, green- and blue-phosphors. Various colors are reproduced according to the different degrees to which electron beams emitted from three electron guns through a shadow mask excite the respective phosphors. To date, the phosphor screen has been formed of a red-emitting phosphor of europium-activated yttrium oxide ($Y_2O_3$:Eu) or europium-activated yttrium oxysulfide ($Y_2O_2S$:Eu), a green-emitting phosphor of copper-activated zinc cadmium sulfide (ZnCdS:Cu), and a blue-emitting phosphor of silver-activated zinc sulfide (ZnS:Ag).

Since, however, the cadmium contained in the green-emitting phosphor is an element extremely toxic to the human body and gives rise to environmental pollution, a cadmium-free copper-activated zinc sulfide has recently come into practical use. FIG. 1 presenting the CIE chromaticities of various color-producing systems proves that this cadmium-free green-emitting phosphor displays, as indicated by a dot $G_2$, a green color less blended with a reddish hue than the prior art green-emitting phosphor of copper-activated zinc cadmium sulfide represented by a dot $G_1$. For reproduction of a white color in a region having a relatively low color temperature, therefore, there has been raised the problem of unavoidably introducing an excess amount of current through a red-emitting electron gun. With IR, IG and IB taken to denote the different amounts of current flowing through the cathodes of the respective electron guns to excite the red-, green- and blue-emitting phosphors for reproduction of a white color of, for example, 6500° K.+7 MPCD, then the combinations of the phosphors and the ratios of the amount of current running through the cathodes of the electron guns have relationship set forth in Table 1 below. It is seen from Table 1 that where a copper-activated cadmium-containing green-emitting phosphor (ZnCdS:Cu) is used, the ratio of IR/IB is 1.66 as against an exceedingly high IR/IB ratio of 2.40 where a cadmium-free green-emitting phosphor is applied, obviously causing a red color-exciting electron gun to have an unduly high load.

| Blue-emitting phosphor | Green-emitting phosphor | Red-emitting phosphor | IR/IB | IR/IG | Relative brightness of a white color |
|---|---|---|---|---|---|
| ZnS:Ag | ZnCdS:Cu | $Y_2O_2S$:Eu | 1.66 | 1.02 | 100 |
| ZnS:Ag | AnS:Cu | $Y_2O_2S$:Eu | 2.40 | 1.26 | 92 |

In case of a cathode ray tube embodying this invention

| | | | | | |
|---|---|---|---|---|---|
| Zns:Ag | ZnS:Au + ZnS:Cu | $Y_2O_2S$:Eu | 1.72 | 1.01 | 99 |

Table 1 above shows that where a cadmium-free copper-activated green-emitting phosphor (ZnS:Cu) is applied, red color-exciting electron beam is focused less satisfactorily, and also less acceptable in consideration of the life of an electron gun. For comparison Table 1 also presents data on a color television cathode ray tube embodying this invention.

The object of this invention is to provide a color television cathode ray tube which comprises a cadmium-free green-emitting phosphor and can decrease the ratio of amounts of cathode currents of red and blue electron guns, IR/IB.

DETAILED DESCRIPTION OF THE INVENTION

The color television cathode ray tube of this invention comprises a phosphor screen or film which is formed of (A) a red-emitting phosphor selected from the group consisting of europium-activated rare earth metal oxide and europium-activated rare earth metal oxysulfide; (B) a green-emitting phosphor selected from the group consisting of a mixture of copper-activated aluminum-coactivated zinc sulfide and gold-activated zinc aluminum-coactivated sulfide, and copper- and gold-activated aluminum coactivated zinc sulfide; and (C) a blue-emitting phosphor of silver-activated zinc sulfide, and wherein the contents of copper and gold in the green-emitting phosphor are 0.005 to 0.02% by weight and 0.005 to 0.15% by weight respectively based on the total amount of the green-emitting phosphor. The above-mentioned rare earth metal oxide and rare earth metal oxysulfide are preferred to contain yttrium or lanthanum as rare earth metal.

BRIEF DESCRIPTION OF THE DRAWINGS

This invention can be more fully understood from the following detailed description when taken in conjunction with the accompanying drawings, in which:

Referring to FIG. 1 showing the CIE chromaticities of color-displaying systems, $G_1$ indicates the chromaticity of a phosphor of ZnCdS:Cu; $G_2$ denotes the chromaticity if a phosphor of ZnS:Cu; B represents the chromaticity of a phosphor of ZnS:Ag; and R means the chromaticity of a phosphor of $Y_2O_2S$:Eu.

This invention is intended to provide a color television cathode ray tube in which a green-emitting phosphor is free from cadmium and which is improved in respect of an abnormal value of the current ratio of IR/IB. This invention is particularly characterized in that a phosphor of gold-activated zinc sulfide, which has not been applied in any prior art color television cathode ray tube is used as one of the components of a green-emitting phosphor. This green-emitting phosphor is prepared by physically mixing a copper-activated zinc sulfide phosphor and a gold-activated zinc sulfide phosphor or from a copper- and gold-activated zinc sulfide phosphor. In this case, an amount of copper doping is chosen to be 0.005 to 0.02% by weight based on the total amount of a green-emitting zinc sulfide phosphor, and an amount of gold doping is chosen to account for 0.005 to 0.15% by weight of the total amount of said phosphor.

It is known that where activated by copper or gold, zinc sulfide displays bright green and yellow colors respectively. Where activated by both copper and gold, zinc sulfide can present any desired shade of color ranging between green and yellow colors according the percentage of a doped material.

Figure 2:
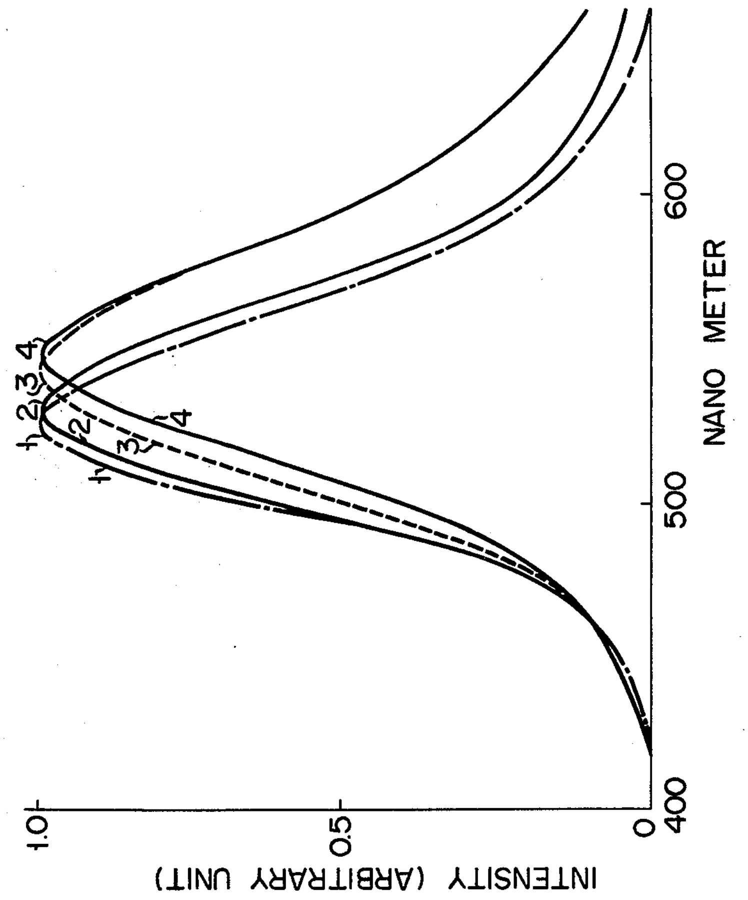
FIG. 2 graphically represents relationship between the composition of a green-emitting phosphor and the distribution of emission spectrum.

FIG. 2 sets forth the distribution of emission spectrum in zinc sulfide phosphors activated by copper and gold alone or by both. Referring to FIG. 2, the numerals 1 to 4 of the four curves denote the undermentioned phosphor compositions Nos. 1 to 4, where decimals indicate the doped amounts of activators.

No. 1—ZnS:Cu 0.02
No. 2—ZnS:Cu 0.02 Au 0.1
No. 3—ZnS:Cu 0.002 Au 0.1
No. 4—ZnS:Au 0.1

Figure 1:
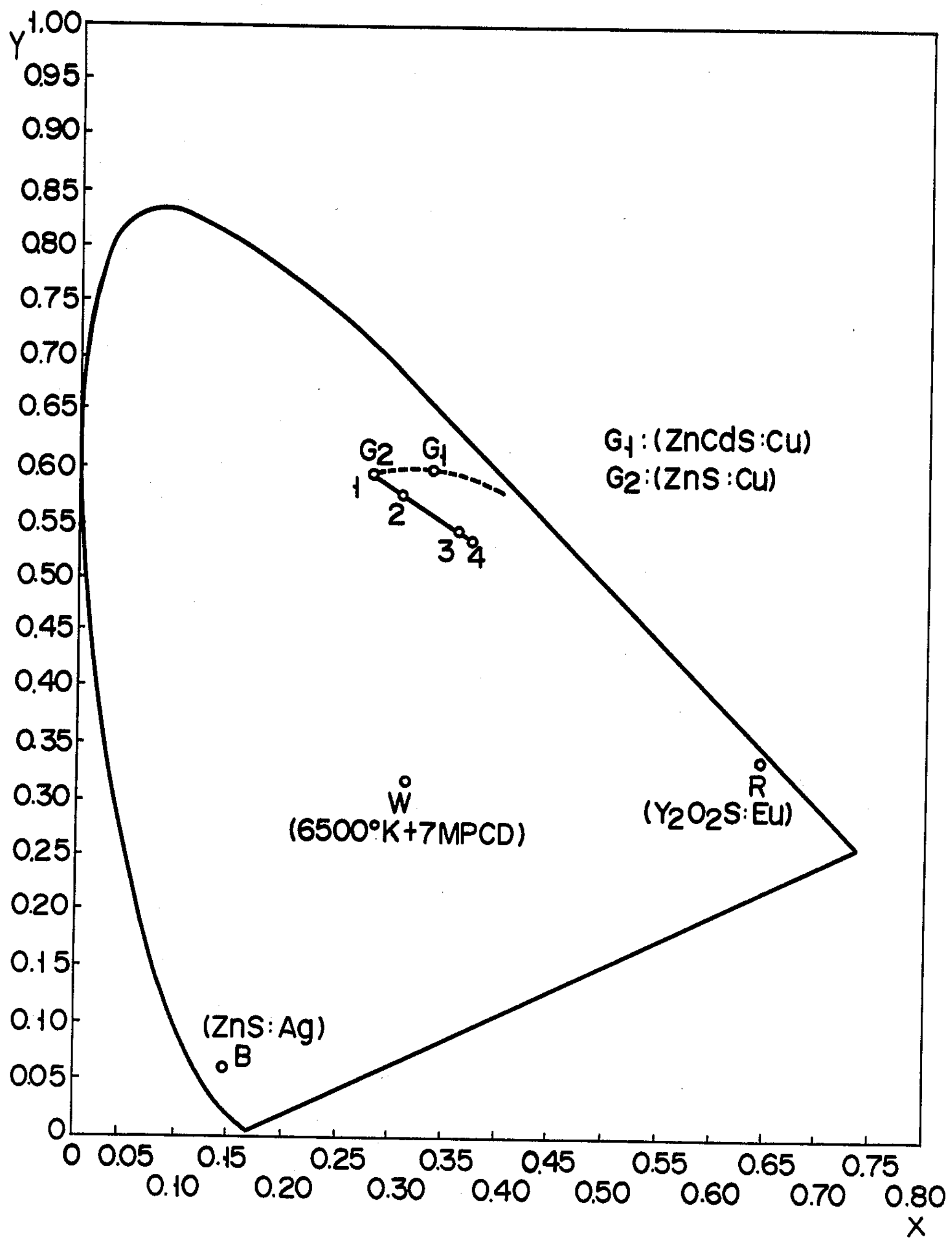
FIG. 1 shows the CIE chromaticities of the various phosphors used with a color television cathode ray tube embodying this invention and those used with the prior art color television cathode ray tube.

These phosphors Nos. 1 to 4 have CIE chromaticities given in FIG. 1.

Where a phosphor of zinc sulfide activated by copper and containing 0.025% by weight of the copper (ZnS:Cu) and a phosphor of zinc sulfide activated by gold and containing 0.1% by weight of the gold (ZnS:Au) are physically mixed, then said mixture displays exactly the same property as a phosphor activated by both copper and gold at the same time. Table 2 shows relationship between the performance of a color television cathode ray tube comprising a phosphor screen formed of a red-emitting phosphor of $Y_2O_2S$:Eu, a blue-emitting phosphor of ZnS:Ag and a green-emitting phosphor prepared from a mixture of ZnS:Cu and ZnS:Au, and the weight ratios of the components of said mixture.

Table 2 Relationship between the weight ratios of mixed green-emitting phosphors (ZnS:Cu+ZnS:Au) and the performance of the resultant color television cathode ray tube Table 2

Relationship between the weight ratios of mixed green-emitting phosphors (ZnS : Cu + ZnS : Au) and the performance of the resultant color television cathode ray tube

| Percentage of mixed green-emitting phosphors | | Content of activator in mixed green-emitting phosphors (% by weight) | | Relative brightness of a green color | Relative brightness of a white color of 6500° K. + MPCD | IR/IB | IR/IG |
|---|---|---|---|---|---|---|---|
| ZnS: Cu | ZnS: Au | Cu | Au | | | | |
| 100 | 0 | 0.02 | 0 | 100 | 100 | 2.40 | 1.43 |
| 90 | 10 | 0.018 | 0.007 | 95 | 100 | 2.10 | 1.25 |
| 80 | 20 | 0.016 | 0.014 | 92 | 99 | 1.91 | 1.18 |
| 70 | 30 | 0.014 | 0.021 | 87 | 99 | 1.85 | 1.10 |
| 60 | 40 | 0.012 | 0.028 | 85 | 100 | 1.72 | 1.01 |
| 50 | 50 | 0.01 | 0.035 | 81 | 98 | 1.65 | 0.94 |
| 40 | 60 | 0.008 | 0.042 | 77 | 99 | 1.62 | 0.83 |
| 30 | 70 | 0.006 | 0.049 | 74 | 95 | 1.58 | 0.77 |
| 20 | 80 | 0.004 | 0.056 | 71 | 96 | 1.58 | 0.71 |
| 10 | 90 | 0.002 | 0.063 | 70 | 93 | 1.52 | 0.65 |
| 0 | 100 | 0 | 0.07 | 68 | 90 | 1.49 | 0.62 |

As seen from Table 2 above, the brightness of mixed green-emitting phosphors progressively decreases, as the component of ZnS:Au is contained in a larger percentage, but the relative brightness of a white color of 6500° K+7MPCD little falls by the increased content of said ZnS:Au. The reason is supposed to be that a relatively large amount of a reddish hue intermingled with the green color of the mixed green-emitting phosphors (ZnS:Cu+ZnS:Au) reduces the necessity of exciting a red-emitting phosphor which essentially has a low light-emitting efficienty. This phenomenon also appears with a green-emitting phosphor activated by both copper and gold at the same time according to the rate in which the doping agents of copper and gold are incorporated, proviing that the performance of a color television cathode ray tube varies with the percentage by weight of copper or gold contained in a green-emitting phosphor, whether the phosphor is activated by both copper and gold or is formed of physically mixed green-emitting components activated by copper and gold respectively as set forth in Table 2.

Figure 3:
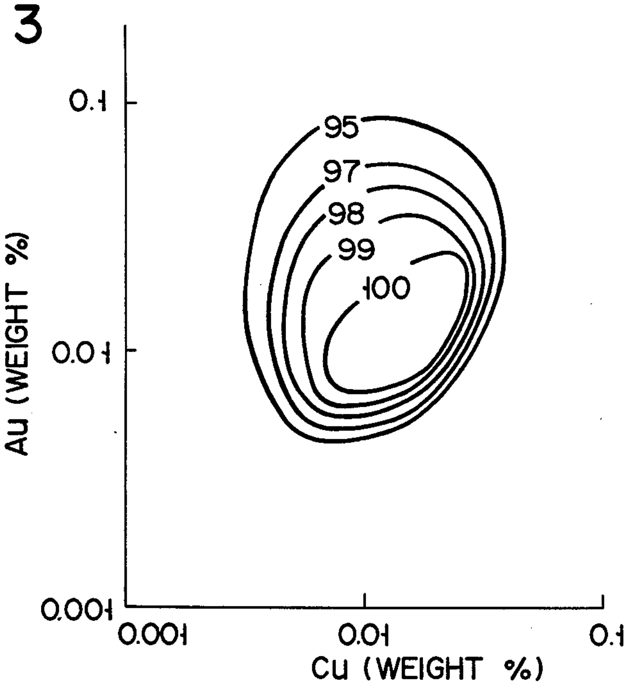
FIG. 3 sets forth relationship between a doped amount of activator and the relative brightness of a while color of 6500° K+7MPCD (where IR/IB≦2) as measured of a green-emitting phosphor of a mixture of copper-activated zinc sulfide and gold-activated zinc sulfide embodying this invention.
Figure 4:
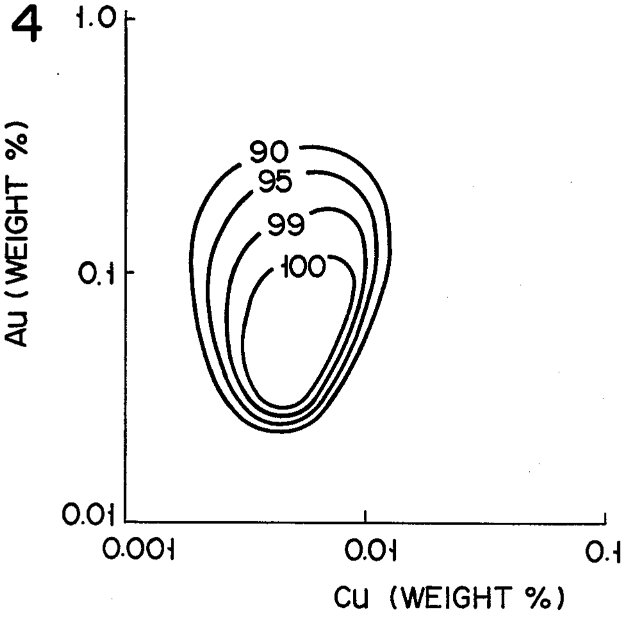
FIG. 4 indicates relationship between a doped amount of activator and the relative brightness of a white color of 6500° K+7MPCD (where IR/IB≦2) as measured of a green-emitting phosphor of copper- and gold-activated zinc sulfide (ZnS:Cu:Au) embodying this invention.

For further reference, FIGS. 3 and 4 show a similar relationship to Table 2 between the percentage by weight of copper and gold contained in a green-emitting phosphor and the relative brightness of a white color, as measured under the condition of $IR/IB \leqq 2$ practically applied to a color television cathode ray tube. Throughout FIGS. 3 and 4, numerals given on contour lines denotes the relative brightness of a white color. Referring to FIG. 3, a green-emitting phosphor is formed of a mixture of two green-emitting components, that is, Cu-activated ZnS and Au-activated ZnS. FIG. 4 represents a green-emitting phosphor of Cu- and Au-activated ZnS.

Examples of the Invention

This invention will be more fully understood by reference to the examples which follow.

EXAMPLE 1

Powder of zinc sulfide was mixed with various solutions respectively containing 0.039 g of copper sulfate ($CuSO_4$ $5H_2O$), 0.71 g of aluminium nitrate ($Al(NO_3)_3.9H_2O$), 0.208 g of gold hydrochlorate ($HAuCl_4.4H_2O$) and 0.3 g of ammonium iodide ($NH_4I$) all based on 100 g of zinc sulfide to provide a pasty mixture of raw materials of a green-emitting phosphor. After dried at 150° C., the mixture was packed in a quartz boat. The packed boat was placed in a quartz tube heated to 980° C. to bake the contents 80 minutes while introducing hydrogen sulfide into the quartz tube. The contents were cooled in streams of hydrogen sulfide, providing (confer. FIG. 4) yellowish green-emitting phosphor of ZnS:Cu0.01:Au0.1 (the decimals are percent by weight). The glass face plate of a color television picture tube was coated with a phosphor formed of a green-emitting phosphor represented by said yellowish green-emitting phosphor (ZnS:Cu0.01:Au0.1), a red-emitting phosphor of $Y_2O_2S$:Eu and a blue-emitting phosphor of ZnS:Ag. A color television cathode ray tube was manufactured by fitting other component members by the customary process. A color television cathode ray tube thus constructed had such emission characteristic that the relative brightness of a white color of 6500° K+7MPCD indicate 99% which was only slightly lower than that which is obtained from a color television cathode ray tube whose phosphor screen contains the prior art green-emitting phosphor of ZnS:Cu. Further with the color televisions cathode ray tube this invention, prominent improvement was achieved on the ratio of amounts of current passing through the cathodes of electron guns as IR/IB=1.77 and IR/IG=1.15.

EXAMPLE 2

0.078 g of copper sulfate ($CuSO_4.5H_2O$), 0.277 g of aluminum nitrate ($Al(NO_3)_3.9H_2O$), and 0.25 g of ammonium chloride ($NH_4Cl$) based on 100 g of zinc sulfide were respectively dissolved in demineralized water. Powder of zinc sulfide was mixed with these solutions to provide a pasty mixture of raw materials of a green-emitting phosphor. After dried at 150° C., the mixture was packed in a quartz boat. The packed boat was placed in a quartz tube heated to 980° C. The contents were baked 80 minutes while hydrogen sulfide was introduced into the quartz tube. The contents were cooled in streams of hydrogen sulfide, providing a green-emitting phosphor of ZnS:Cu whose Cu content was 0.02% by weight. Next, powder of zinc sulfide was mixed with various solutions respectively containing 0.146 g of gold hydrochlorate ($HAuCl_4.4H_2O$), 0.399 g of aluminum nitrate ($Al(NO_3)_3.9H_2O$), and 0.3 g of ammonium iodide ($NH_4I$) all based on 100 g of zinc sulfide to provide a pasty mixture of raw materials of a phosphor. After dried at 150° C., the mixture was baked by the same process as described above, providing a yellow-emitting phosphor of ZnS:Au whose Au content was 0.07% by weight.

60 g of ZnS:Cu phosphor and 40 g of ZnS:Au phosphor both obtained in the above-mentioned manner were mixed. The mixture was dispersed in a ball mill with addition of demineralized water. Thereafter, polyvinyl alcohol and ammonium bichromate were added to provide a green-emitting phosphor in the form of activate slurry. The Cu content and Au content were 0.012% by weight and 0.028% by weight respectively based on the total amount of ZnS:Cu and ZnS:Au. (confer FIG. 3). The glass face plate of a picture tube was coated with a phosphor formed of said green-emitting phosphor, a blue-emitting phosphor of ZnS:Ag and a red-emitting phosphor of $Y_2O_3$:Eu. A color television cathode ray tube was manufactured with other members fitted by customary practice. A cathode ray tube thus obtained had such emission characteristic that the relative brightness of a white color of 6500° K+7MPCD indicated 99%, slightly lower than a phosphor screen containing the prior art green-emitting phosphor of ZnS:Cu.

Further, noticeable improvement was achieved in the ratio of amounts of current running through the cathodes of electron guns, as IR/IB=1.72 and IR/IG=1.01.

EXAMPLE 3

A color television cathode ray tube was manufactutred in substantially the same manner as in Example 1, excepting that a red-emitting phosphor was formed of $La_2O_2S$:Eu. A color television cathode ray tube thus constructed had such emission characteristic that the relative brightness of a white color of 6500° K+7MPCD indicated 97%, a value only slightly lower than that which is obtained from a color television cathode ray tube whose phosphor screen contains the prior art green-emitting phosphor of ZnS:Cu. Further, appreciable improvement was attained in the ratio of amounts of current conducted through the cathodes of electron guns as IR/IB=1.80 and IR/IG=1.17. In Example 3, the red-emitting phosphor contained lanthanum instead of yttrium, rendering a color television cathode ray tube less expensive than that of Example 1.

There has been described the red-, green- and blue-emitting phosphors used with a color television cathode ray tube embodying this invention with reference only made to the matrices of these phosphors and the corresponding activators. However, the phosphor doped with co-activators display the same effect. Obviously, therefore, this invention includes a green-emitting phosphor, for example, ZnS:CuAl and ZnS:CuAlCl; a red-emitting phosphor, for example, $Y_2O_2S$:EuTb; and a blue-emitting phosphor, for example, ZnS:AgCl.

What we claim is:

1. A color television cathode ray tube which comprises a phosphor screen formed of (A) a red-emitting phosphor selected from the group consisting of europium-activated rare earth metal oxide and europium-activated rare earth metal oxysulfide;

(B) a green-emitting phosphor selected from the group consisting of a mixture of copper-activated aluminum-coactivated zinc sulfide and gold-activated aluminum-coactivated zinc sulfide, and copper- and gold-activated aluminum-coactivated zinc sulfide; and (C) a blue-emitting phosphor of silver-activated zinc sulfide, and wherein the content of copper and the content of gold in the green-emitting phosphor are 0.005 to 0.02% by weight and 0.005 to 0.15% by weight, respectively, based on the total amount of the green-emitting phosphor.

2. The cathode ray tube according to claim 1, wherein the rare earth metal oxide is a europium-activated yttrium oxide, and the rare earth metal oxysulfide is a europium-activated yttrium oxysulfide.

3. The cathode ray tube according to claim 1, wherein the rare earth metal oxysulfide is europium-activated lanthanum oxysulfide.

* * * * *